(12) United States Patent
Bellec et al.

(10) Patent No.: US 11,796,133 B2
(45) Date of Patent: Oct. 24, 2023

(54) AUTOMATIC OBSTRUCTION DEVICE OF A CIRCUIT FOR FILLING ONE OR MORE TANKS WITH A FLUID

(71) Applicant: PLASTIC OMNIUM NEW ENERGIES FRANCE, Lyons (FR)

(72) Inventors: Ronan Bellec, Brussels (BE); Nicolas Hubatzeck, Brussels (BE); Ammar Aryan, Brussels (BE); Bjorn Criel, Brussels (BE)

(73) Assignee: PLASTIC OMNIUM NEW ENERGIES FRANCE, Lyons (FR)

( * ) Notice: Subject to any disclaimer, the term of this patent is extended or adjusted under 35 U.S.C. 154(b) by 0 days.

(21) Appl. No.: 17/904,767

(22) PCT Filed: Feb. 23, 2021

(86) PCT No.: PCT/EP2021/054428
§ 371 (c)(1),
(2) Date: Aug. 22, 2022

(87) PCT Pub. No.: WO2021/170572
PCT Pub. Date: Sep. 2, 2021

(65) Prior Publication Data
US 2023/0038955 A1    Feb. 9, 2023

(30) Foreign Application Priority Data

Feb. 24, 2020    (FR) ...................................... 2001793

(51) Int. Cl.
*F17C 5/00* (2006.01)
*B67D 7/32* (2010.01)

(52) U.S. Cl.
CPC ............ *F17C 5/007* (2013.01); *B67D 7/3218* (2013.01); *F17C 2205/0142* (2013.01);
(Continued)

(58) Field of Classification Search
CPC ...... F17C 2205/0323; F17C 2205/0326; F17C 2205/0332; F17C 2205/0335; F16K 11/06; F16L 55/1022
(Continued)

(56) References Cited

U.S. PATENT DOCUMENTS

| 2,081,542 A | * | 5/1937 | Kidney | ................ F04B 49/225 |
| | | | | 251/32 |
| 2,108,068 A | * | 2/1938 | Larry | .................... F16L 55/132 |
| | | | | 285/125.1 |

(Continued)

FOREIGN PATENT DOCUMENTS

| CA | 2860682 A1 * | 10/2014 | ......... F02M 21/0221 |
| CN | 103388741 A | 11/2013 | |

(Continued)

OTHER PUBLICATIONS

International Search Report dated Jul. 9, 2021 in PCT/EP2021/054428 filed on Feb. 23, 2021, 2 pages).

(Continued)

*Primary Examiner* — Timothy L Maust
(74) *Attorney, Agent, or Firm* — Oblon, McClelland, Maier & Neustadt, L.L.P.

(57) ABSTRACT

An automatic obstruction device for closing a filling circuit for filling a tank with fluid includes: a movable element movable between a non-obstruction position of the filling circuit, in which the movable element offers resistance to the fluid compatible with the filling of the tank, and an obstruction position of the filling circuit, in which the movable offers a resistance to the fluid that is incompatible with the filling of the tank; a holding element of the movable element holding the movable element in the non-obstruction position, and allowing movement of the movable element toward the obstruction position; and a first device of non-reversible movement or of non-reversible modification of (Continued)

the holding element allowing movement of the movable element toward the obstruction position, and being controllable by a control device.

10 Claims, 4 Drawing Sheets

(52) U.S. Cl.
CPC ............... *F17C 2205/0146* (2013.01); *F17C 2205/0326* (2013.01); *F17C 2205/0332* (2013.01); *F17C 2221/012* (2013.01); *F17C 2221/033* (2013.01); *F17C 2221/035* (2013.01); *F17C 2223/036* (2013.01); *F17C 2227/04* (2013.01); *F17C 2250/032* (2013.01); *F17C 2250/043* (2013.01); *F17C 2250/0439* (2013.01); *F17C 2250/0478* (2013.01); *F17C 2260/042* (2013.01); *F17C 2265/065* (2013.01); *F17C 2270/0168* (2013.01)

(58) Field of Classification Search
USPC .................................................. 137/151, 456
See application file for complete search history.

(56) References Cited

U.S. PATENT DOCUMENTS

| | | | | |
|---|---|---|---|---|
| 2,763,282 A * | 9/1956 | Reedy | .................... | F16L 55/105 251/168 |
| 2,867,228 A * | 1/1959 | Rike | .................... | F16K 17/383 137/68.12 |
| 2,913,012 A * | 11/1959 | McCurley | ............. | F16L 55/105 251/191 |
| 2,924,423 A * | 2/1960 | Weiser | .................. | B60T 11/326 280/421 |
| 3,630,216 A * | 12/1971 | Kelly | ........................ | F16K 17/10 137/75 |
| 4,369,813 A * | 1/1983 | Thomas | ................ | F16L 55/124 138/94 |
| 4,382,449 A * | 5/1983 | Nelson | .................... | F16K 17/36 251/65 |
| 4,485,832 A * | 12/1984 | Plemmons | ............ | F16K 17/366 137/38 |
| 4,721,128 A * | 1/1988 | Padilla | ................. | F16L 55/1022 137/487.5 |
| 4,785,842 A * | 11/1988 | Johnson, Jr. | .......... | F16K 31/086 251/65 |
| 4,830,045 A * | 5/1989 | Fujikawa | ................. | F16K 17/30 137/557 |
| 4,844,113 A * | 7/1989 | Jones | ..................... | F16K 17/363 137/460 |
| 4,847,599 A * | 7/1989 | Imiolex | .................. | F16K 17/20 73/40.5 R |
| 5,103,852 A * | 4/1992 | Jones | ...................... | F16K 17/40 137/71 |
| 5,146,942 A * | 9/1992 | Taylor | ................... | F16K 17/406 137/461 |
| 5,209,253 A * | 5/1993 | Taylor | ................... | F16K 17/164 137/461 |
| 5,299,607 A * | 4/1994 | Monticup, Jr. | ...... | B67D 7/3218 137/71 |
| 6,016,834 A * | 1/2000 | Leidl | ..................... | B60K 15/01 137/571 |
| 6,041,762 A * | 3/2000 | Sirosh | ..................... | F17C 13/04 123/529 |
| 6,045,115 A * | 4/2000 | Martin, Jr. | .............. | F16K 1/305 138/44 |
| 6,460,564 B1 * | 10/2002 | Rief | .................... | F16K 11/0853 137/625.46 |
| 6,892,752 B2 * | 5/2005 | Burlock | ................ | F16L 55/132 137/553 |
| 7,275,569 B2 * | 10/2007 | Hobbs | ....................... | C01B 3/34 141/82 |
| 7,798,165 B2 * | 9/2010 | McClung, Jr. | ......... | G01M 3/283 138/104 |
| 8,020,576 B2 * | 9/2011 | Lauber | ................. | B67D 7/3218 137/68.14 |
| 8,066,032 B2 * | 11/2011 | Zeloof | ..................... | F16K 7/10 138/92 |
| 8,104,517 B2 * | 1/2012 | German | ................ | F16L 55/124 138/93 |
| 8,794,254 B2 * | 8/2014 | Maier | ..................... | F17C 13/00 137/72 |
| 2005/0150566 A1 | 7/2005 | Funt et al. | | |
| 2005/0229985 A1 * | 10/2005 | Saxenfelt | ............... | A63B 41/02 138/93 |
| 2009/0126818 A1 * | 5/2009 | Zeloof | ..................... | F16K 7/10 138/104 |
| 2010/0132806 A1 * | 6/2010 | Burczynski | ............. | E03B 9/16 137/285 |
| 2016/0290561 A1 * | 10/2016 | Whiteman | ............ | F17C 13/025 |

FOREIGN PATENT DOCUMENTS

| | | | |
|---|---|---|---|
| CN | 103753500 A | 4/2014 | |
| CN | 104088114 A | 10/2014 | |
| CN | 208418154 U | 1/2019 | |
| CN | 110131577 A | 8/2019 | |
| EP | 2287458 A2 * | 2/2011 | ....... B60K 15/03006 |
| FR | 3 042 254 A1 | 4/2017 | |
| JP | 53-83119 | 7/1978 | |
| JP | 2007-255666 A | 10/2007 | |
| JP | 2011-179519 A | 9/2011 | |
| JP | 2018-132292 A | 8/2018 | |
| WO | 02/12779 A1 | 2/2002 | |
| WO | WO 2006/006715 A1 | 1/2006 | |
| WO | WO 2013/045043 A1 | 4/2013 | |
| WO | WO 2016/156519 A1 | 10/2016 | |

OTHER PUBLICATIONS

Japanese Office Action dated Feb. 6, 2023, in the Japanese Application No. 2022-550826 (with English Translation), 9 pages.

* cited by examiner

AUTOMATIC OBSTRUCTION DEVICE OF A CIRCUIT FOR FILLING ONE OR MORE TANKS WITH A FLUID

The invention relates to the field of the storage and distribution of fluids, in particular of pressurized fluids, in particular the field of tanks intended to contain fuels to supply chemical energy to all fixed or mobile equipment (road, rail, sea, air, space vehicles). The invention relates more particularly to a valve for a fluid tank, in particular a pressurized fluid tank. The invention also relates to an automatic obstruction device of a circuit for filling one or more tanks with a fluid.

In vehicles using multiple pressure vessels, for example, two to twelve hydrogen storage tanks compressed to 700 bar (abbreviated as H70 in ANSI HGV 3.1) or 350 bar (abbreviated as H35 in ANSI HGV 3.1) or compressed natural gas storage tanks at 200 bar (abbreviated as CNG), each tank is fitted with a shut-off valve and, as required, a temperature and/or pressure sensor.

These valves allow:

the pressurized fluid tanks to be isolated from the pressure regulation circuit when the fluid supply is not required by the vehicle, a fluid consumption system to be powered such as, for example, a fuel cell or a heat engine, when the fluid supply is required for the operation of the vehicle, tank filling operations to be performed via a specific filling interface connected to a filling station.

Each of these equipment items is managed by a central computer or by control modules managing all or part of these equipment items. Depending on the number of these equipment items, the design of these computers should be adjusted to the application envisaged. These equipment items also have specific communication interfaces that do not necessarily exist on the computers already present in the vehicle. These adaptations entail either an additional cost to design the computer as needed (specific development), or an additional cost due to the necessary oversizing of a generic computer.

The object of the invention is in particular to provide a system comprising fluid tanks, in particular pressurized fluid tanks, managed by a central computer, not requiring the adaptations mentioned above.

To this end, the subject-matter of the invention is a valve for a fluid tank, in particular for a pressurized fluid tank. The valve comprises at least one portion of a sensor for measuring at least one parameter characterizing the fluid, and the valve is capable of receiving information from a computer, external to the valve. The valve further comprises an internal computer comprising:

a first acquisition means configured to acquire data from the at least one sensor, a communication means capable of communicating bidirectionally with the external computer, and a control means configured to take into account information received from the external computer and data from the at least one sensor for controlling at least one actuator of the valve.

Thus, the valve is made autonomous, being able to be adapted to the management of different equipment items, without requiring an adjustment of the computer external to the valve, or the development of costly additional interfaces.

"Portion of a sensor," for example, refers to a sensitive element of the sensor, a casing of the sensor, an electrical connection of the sensor, a thimble for a sensor (when the sensor is a temperature sensor), etc.

The fluids in question are, for example, gasoline, diesel, compressed hydrogen, compressed natural gas, liquefied petroleum gas (abbreviated as LPG) or biogas, for example biomethane.

According to other optional features of the valve for a fluid tank, taken alone or in combination:

The valve is an electro-valve. This makes it possible to control the valve by means of an electric command.

The at least one actuator of the valve is connected to the control means by at least one electrical connection, and comprises a means for measuring at least one current parameter in the electrical connection. This makes it possible to establish a diagnosis of the state of the valve without requiring remote measurements. Such a diagnosis is free from the background noise generated by remote measurements. It is therefore more reliable. Safety is therefore improved.

The first acquisition means is configured to acquire data from at least one sensor associated with the tank, for example a sensor making it possible to measure the integrity of the tank, such as a Bragg fiber sensor, an ultrasonic sensor, an accelerometer, or a strain sensor.

At least one measured parameter is the temperature or the pressure, and the first acquisition means is configured to acquire data from the temperature or pressure sensor. The temperature sensor is, for example, a negative temperature coefficient (NTC) thermistor or a platinum resistance thermometer of the Pt100 or Pt1000 type.

The acquisition of data from the temperature sensor and/or the pressure sensor is managed by an analog or digital communication interface, for example, a LIN (for "Local Interconnect Network") interface, a SENT (for "Single Edge Nibble Transmission") interface, a CAN (for "Controller Area Network") interface, a FlexRay interface or an Ethernet interface.

At least one measured parameter is the temperature, and the first acquisition means is configured to acquire data from the temperature sensor.

Communication between the external computer and the valve is done via a communication module using an interface of the CAN, FlexRay or LIN type.

The control of the actuator of the valve is provided by a control means that acts on an actuator of the valve, for example, a solenoid operating at constant or pulsed direct current, for example, by PWM (for "Pulse Width Modulation"). Alternatively, the solenoid operates in "Peak and Hold."

The internal computer comprises one or more valve actuator control module(s).

The internal computer comprises a calculation module making it possible to process the data from the sensor comprised at least in part in the valve from at least one actuator of the valve, and to construct and take into account the information exchanged with the external computer.

The communication means is able to communicate information to the external computer on the state of the tank, such as the gauging, the integrity of the tank, the open or closed state of the valve, the integrity of the valve, the temperature in the tank, the pressure within the tank, general information on the tank such as its date of manufacture, its volume, its nominal operating pressure and the nature of the pressurized fluid (H35, H70, CNG, etc.).

The communication means is capable of receiving and executing requests from the external computer concerning the tank. These requests are, for example, a request to make fluid available (for a fuel cell or a heat engine, for example), a filling request at a station, a request to isolate the tanks in the event of an accident, or any other specific need.

The internal computer comprises a second acquisition means configured to acquire, store and communicate data concerning the duration of use of the tank, such as the time of use of the tank (for example the number of years of use of the tank) and/or the number of tank filling cycles. In fact, the regulations limit the usage period of the tank (fifteen years for hydrogen storage systems, twenty years maximum for CNG storage systems) and the number of filling cycles (5,000 minimum for hydrogen storage and 15,000 minimum for CNG storage systems). In general, the usage limit of a tank is indicated on a label affixed to the tank and to the filling hatch of the vehicle equipped with this tank, and by design in order to guarantee that the maximum number of filling cycles defined by tank manufacturer is sufficient for the entire life of the vehicle (fifteen or twenty years). This visual indication of the usage limit of the tank has the drawback of being based on an easily degradable and easy-to-ignore support, so that there is nothing to prevent filling cycles from continuing beyond the prescribed limit. The management and communication of the tank usage data by the valve to the external computer allows the management of this information to be made more reliable and for example allows starting of the vehicle to be prevented when the prescribed limit is reached.

The invention also relates to a tank comprising a valve as described above.

Another object of the invention is a system comprising several tanks as described above, as well as a computer external to the valves of said tanks. Thus, a variable number of tanks can be integrated into the vehicle without requiring an adjustment of the computer external to the valves, or the development of additional interfaces.

According to an optional feature of the system, the tanks are connected to at least one single fluid manifold.

The invention also relates to a method for managing a system as described above, comprising the steps of:
acquisition by the internal computer of data from the at least one sensor,
two-way communication with the external computer,
taking into account of the information received from the external computer and the data from the at least one sensor.

The storage of fluids, in particular of pressurized fluids, which are easily flammable, is associated with safety risks for users. One of the major risks is to fill a damaged tank, which can lead to rupture and explosion of the tank. Currently, this risk is reported mainly in the user manual of the tank, which manual recommends avoiding the use of a tank after an accident, and the need to check the system. However, these instructions are not always respected and accidents occur. The applicant has identified that safety would be greatly improved by preventing the filling of a tank when a safety risk is detected.

The invention aims to provide a robust means of preventing the filling of a tank when a safety risk is detected.

To this end, the invention relates to an automatic obstruction device for closing a filling circuit for filling one or more tank(s) with a fluid, in a manner at least partially sealed to the fluid, so as to prevent the filling of the one or more tank(s) when a predetermined event occurs, the automatic obstruction device comprising:

at least one movable element, capable of being moved between a non-obstruction position of the filling circuit, in which the at least one movable element is able to be positioned so as to offer a resistance to the fluid compatible with the filling of the tank, and an obstruction position of the filling circuit, in which the at least one movable element is able to be positioned so as to offer a resistance to the fluid that is incompatible with the filling of the tank, at least one holding element of the at least one movable element, capable
of holding the at least one movable element in the non-obstruction position, and
of being deformed or moved so as to allow the movement of the at least one movable element toward the obstruction position,
at least a first means of non-reversible movement or of non-reversible modification of the at least one holding element so as to allow the movement of the at least one movable element toward the obstruction position,
the at least one first means of non-reversible movement or non-reversible modification being controllable by a control device.

An obstruction device that is actuated independently of the will of a user is said to be "automatic".

An element whereof at least a portion is able to move relative to the rest of the filling circuit according to the invention is said to be "mobile". The movement of the movable element can be an expansion movement.

The term "movable element" is understood to mean the assembly constituted by the movable element and its appendages, such as a connection with the first non-reversible movement means.

The invention then makes it possible to close the filling circuit irreversibly in order to prevent any reopening of the circuit without manual intervention by an authorized person. The tank system is therefore safer.

Furthermore, the movable element playing the role of a fuse does not require a structure as complicated as a traditional valve. Consequently, the obstruction device is simpler to manufacture and less expensive.

According to other optional features of the automatic obstruction device, taken alone or in combination:

The at least one movable element is capable of being positioned at least in part in at least one portion of the automatic obstruction device, which portion is intended to be assembled in a sealed manner to the filling circuit; at least one orifice is located in at least one wall of the at least one portion of the automatic obstruction device; the at least one orifice is capable of:
being sealed in a fluid-tight manner by the at least one holding element of the at least one movable element, and of
allowing the at least one movable element to enter the at least one portion, so that the at least one movable element can reach the obstruction position. This allows the automatic obstruction device to be sealed to any filling circuit.

The predetermined event is a detection of a safety defect of at least one of the tanks. This prevents the faulty tank(s) from being filled.

The at least one movable element and the at least one holding element form one and the same element. This makes it possible to simplify the construction of the automatic obstruction device by limiting the number of its components.

In one embodiment, the movable element is an enclosure capable of inflating under the pressure of a second fluid. The movable element also constitutes the holding element, which in the uninflated state is retained in the non-obstruction position. It is assembled at the orifice in such a way that it seals it in a fluid-tight manner, and is deformed so as to allow the movable element to move toward the obstruction position. In this embodiment, the first non-reversible movement means is a device producing the second fluid (for example, a water pump).

In another embodiment, the movable element and the holding element form one and the same element whose section and material (for example, rubber) are capable of retaining it in the orifice while sealing it in a fluid-tight manner. The movable element/holding element is associated with a propulsion device (the first non-reversible movement means, for example a pyrotechnic propulsion means), which allows its movement toward the obstruction position. In a variant embodiment, the movable element/holding element is associated with an actuator (the first non-reversible movement means, for example the rod of a cylinder), which allows its movement toward the obstruction position.

The invention also relates to a circuit for filling one or more tank(s) with a fluid, in particular a pressurized fluid, comprising a device as described above.

Thus, the tank filling circuit is decommissioned independently of the will of a user, thereby greatly limiting the risks of undesirable filling of the tanks. The automatic obstruction device can allow management of safety problems related to the occurrence of an accident or in the event the maximum usage duration of the tanks and/or the maximum number of tank filling cycles is reached.

Preferably, the tank(s) are connected in leak-tight manner to the filling circuit. This makes it possible to fill the pressurized fluid tank(s), for example with hydrogen or CNG.

Preferably, the at least one portion of the automatic obstruction device is placed in the filling circuit and assembled in a leak-tight manner to the filling circuit. This makes it possible to manufacture a portion of the automatic obstruction device separately from the filling circuit and to assemble it to the latter subsequently.

Alternatively, the at least one portion of the automatic obstruction device is a portion of the filling circuit. This makes it possible to manufacture a portion of the automatic obstruction device and a portion of the filling circuit together, in a single piece.

In the non-obstruction position of the filling circuit, the filling circuit offers a minimum resistance to the passage of fluid, compatible with the filling of tanks.

Optionally, the automatic obstruction device further comprises at least one second means for moving the at least one movable element toward the obstruction position when the at least one movable element has been released from the at least one holding element.

Preferably, the movement of the at least one movable element is in a direction substantially transverse to a longitudinal direction of said at least one portion of the automatic obstruction device.

Advantageously, the automatic obstruction device further comprises at least one locking element for locking the at least one movable element in the obstruction position.

The filling circuit comprises a valve for each tank, which in turn comprises an inlet pipe upstream of the valve, and an outlet pipe downstream of the valve. The at least one orifice in at least one wall of the automatic obstruction device can be located in the inlet pipes upstream of the valves, in a line dedicated to filling located upstream of the inlet pipes of the valves, in a filling interface of the filling circuit connected to a filling station, or in outlet pipes downstream of the valve. The filling station is not part of the filling circuit within the meaning of the invention.

The terms "downstream" and "upstream" are to be considered according to the position in the filling circuit. A position close to the filling station is qualified as "upstream" and a position closer to the tank is qualified as "downstream".

Advantageously, the at least one orifice is located in at least one side wall of the at least one portion of the automatic obstruction device.

Optionally, the automatic obstruction device further comprises a guide, for example a hollow body, in which the at least one movable element can be moved to pass from the non-obstruction position to the obstruction position.

Advantageously, the second movement means is an elastic element acting between the movable element and a distal bearing surface of the guide. The terms "distal" and "proximal" are to be considered according to the position relative to the filling circuit. A position close to the circuit is qualified as "proximal" compared to a position further away, which is qualified as "distal".

Advantageously, the at least one portion of the automatic obstruction device in which the at least one orifice is located comprises at least one undercut arranged opposite the at least one orifice, diametrically opposite the at least one orifice, in which undercut the at least one movable element can be partly housed in the obstruction position.

The at least one movable element of the at least one automatic obstruction device can be brought back from the obstruction position to the non-obstruction position, under the action of an unlocking tool. The use of such a tool may require authorization. Thus, subject to the necessary checks, the tanks can be refilled and used.

The invention also relates to an assembly of a circuit for filling one or more tank(s) with a fluid as described above, the tank(s) and a control device.

The control device can be a computer or a mechanical system changing state for example due to its aging, the time of use, or the number of usage cycles.

The computer can be a central computer, external to the valves, or a computer internal to each valve.

The invention also relates to a method for securing one or more fluid tank(s) forming part of an assembly as described above, comprising the steps of:

taking into account by the control device of safety defect information of at least one of the tanks, transmission of an obstruction order by the control device to at least one obstruction device, taking into account of the order by the at least one obstruction device, passage of at least one automatic obstruction device from the non-obstruction position to the obstruction position.

BRIEF DESCRIPTION OF THE FIGURES

The invention will be better understood upon reading the description which follows, given solely by way of example and with reference to the appended drawings in which.

DETAILED DESCRIPTION

Figure 1:
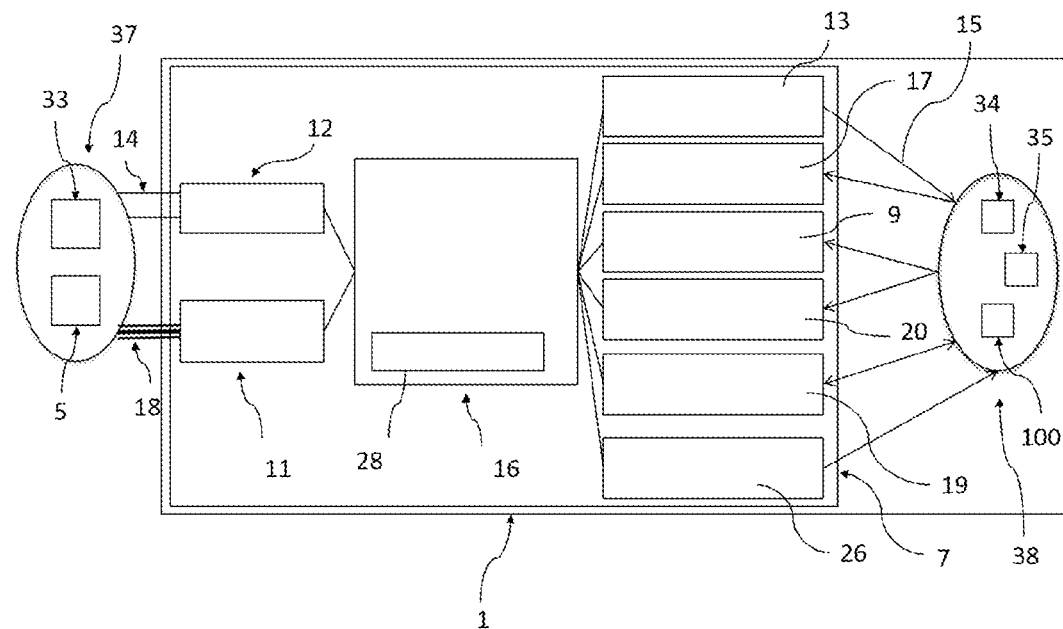
FIG. 1 is a block diagram of a valve according to one embodiment and of a computer external to the valve.
Figure 2:
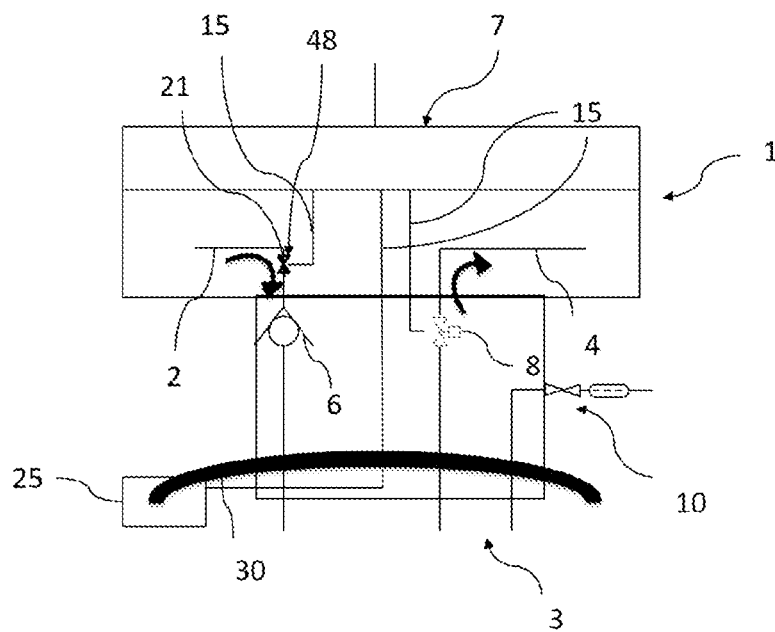
FIG. 2 is a schematic side view of the valve of FIG. 1 and part of a tank for which it is intended, an automatic obstruction device of the filling circuit according to one embodiment of another object of the invention being positioned in the inlet pipe upstream of the valve.

FIG. 1 shows the technical solutions of a valve 1 according to the invention. FIG. 2 is a schematic illustration of the valve 1 for a fluid tank 3, in particular for pressurized fluid, for example, compressed hydrogen, only the upper end 30 of which is shown. The valve 1 is part of a filling circuit, not shown, of the tank of a vehicle, not shown. The valve 1 is an electro-valve connected at the inlet to an inlet pipe 2 in the valve 1, and to an outlet pipe 4 of the valve 1, respectively connected in the valve 1 to an inlet valve 6, and at the outlet to an outlet valve 8. The valve 1 also comprises a TPRD ("Thermal and Pressure Release Device") decompression device 10. The valve 1 comprises at least one sensor comprised at least in part in the valve 1 to measure at least one parameter characterizing the fluid. In this embodiment, the sensor is a temperature sensor 35 and the parameter measured is the temperature of the fluid. The valve 1 is capable of receiving information from a computer 5 external to the valve 1. The valve 1 comprises at least one actuator 100 and an internal computer 7 that comprises a power supply 12 of the internal computer 7 and at least one actuator 100 of the valve 1. The power supply 12 is supplied with electricity by a battery 33 of the vehicle through electrical connection wires 14. The external computer 5 and the battery 33 are part of the technical perimeter 37 of the vehicle, while the temperature sensor 35 and the actuator 100 are part of the technical perimeter 38 of the valve 1. The internal computer 7 comprises a central processing unit 16 that comprises a microprocessor 28, as well as the following modules:

a first means 9 for acquiring data from the at least one sensor, a means 11 of communication to communicate bidirectionally with the external computer 5, a control means 13 configured to take into account information received from the external computer 5 and data from the at least one sensor for controlling at least one actuator 100 of the valve 1. In this embodiment, the actuator 100 is a solenoid and the control means 13 acts on the solenoid operating at constant direct current and, in a variant, at pulsed direct current (Peak and Hold).

In this embodiment, the means 11 of communication with the external computer 5 is a module using an interface of the CAN, FlexRay or LIN type. The module 11 and the external computer 5 are interconnected by a connection 18.

The at least one actuator 100 is connected to the control means 13 by at least one electrical connection 15. In the embodiment shown in FIGS. 1 to 3, the central processing unit 16 also comprises:

a means 17 for measuring at least one current parameter in the electrical connection 15, a second means 19 for acquiring, storing and communicating data concerning the usage duration of the tank 3, such as the usage time of the tank 3 and/or its number of filling cycles, a third means 20 for acquiring data from another sensor comprised at least in part in the valve 1, to measure at least one parameter characterizing the fluid; in this embodiment, this other sensor is a fluid pressure sensor 34, and a means 26 for controlling a device 21 capable of closing the filling circuit of the tank, here at the inlet pipe of the valve 1, when a safety risk is detected. The device 21 is also the subject of the invention. The inlet pipe 2 comprises an orifice 48, capable of allowing a movable element of the device 21, not shown here, to pass through the inlet pipe 2 of the valve 1.

In this embodiment, the second acquisition means 19 is also configured to acquire data coming from at least one sensor 25 associated with the tank 3, making it possible to measure the integrity of the latter. It is for example a sensor making it possible to measure the integrity of the tank, such as a Bragg fiber sensor, an ultrasonic sensor, an accelerometer, or a strain sensor.

Figure 3:
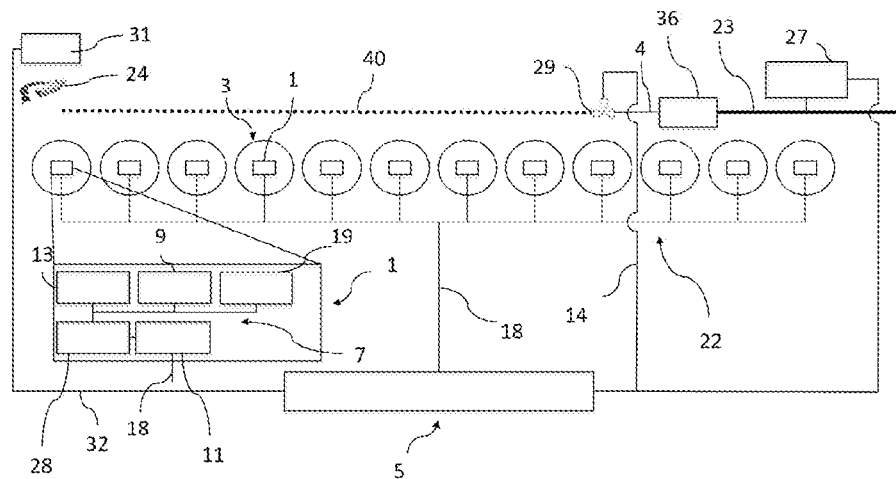
FIG. 3 is a schematic view of a system comprising several tanks according to one embodiment of the invention.

FIG. 3 shows a system 22 according to the invention, in this embodiment comprising a filler neck 24, a safety valve 29 and twelve fluid tanks 3, each equipped with a valve 1 according to the invention. As shown in FIG. 2, each valve 1 comprises an outlet valve 8. The outlet valve 8 is an electro-valve controlled by at least one actuator 100 controlled by the control means 13 of the internal computer 7. The outlet pipe 4 from the outlet valve 8 puts the tank 3 in fluid communication with a single fluid manifold 23, through the filling circuit 40 and the safety valve 29. The manifold 23 is equipped with a pressure regulator 36 and a safety pressure sensor 27, the role of which is to guide the fluid to the fluid consumption system of the vehicle, not shown, for example a fuel cell or a heat engine. The safety valve 29 is an electro-valve connected to the pressure regulator 36; it is controlled by the external computer 5 and makes it possible to isolate the filling circuit 40 from the manifold 23 during the filling of the tanks. The safety valve 29 also makes it possible to isolate the filling circuit 40 from the manifold 23 when the manifold 23 presents a failure, for example, a leak. The filler neck 24 is connected to the filling circuit 40 and, through the inlet pipes 2, allows the tanks 3 to be filled with fluid at the filling station. An infrared communication device 31 associated with the filler neck 24 allows the external computer 5 to communicate information to the filling station, through an electrical connection 32. The communicated information is, for example, the pressure, the temperature and the volume of the tanks.

Figure 4:
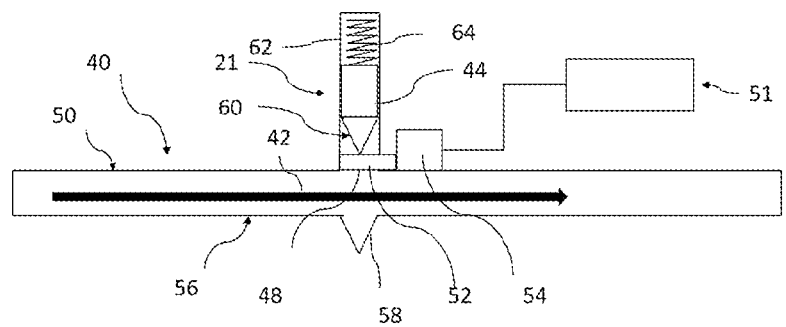
FIG. 4 is a schematic view of a circuit for filling tank(s) with a fluid according to one embodiment of the invention, in which the automatic obstruction device is in the non-obstruction position.
Figure 5:
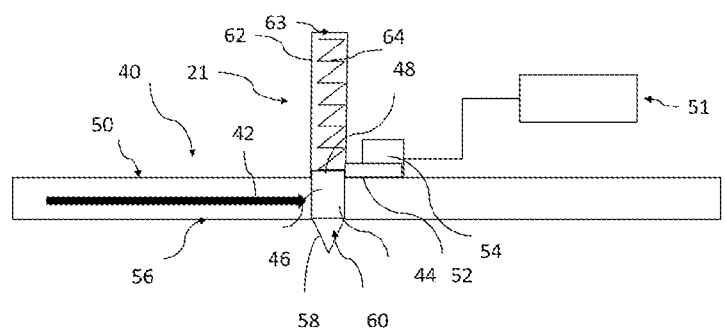
FIG. 5 is a schematic view of the same filling circuit with the automatic obstruction device in the obstruction position.

FIGS. 4 and 5 schematically show a filling circuit 40 for filling one or more tanks(s) with a fluid. The arrow 42 symbolizes the flow of fluid when the filling circuit 40 is supplied with fluid. The filling circuit 40 comprises an automatic obstruction device 21 capable of closing the filling circuit 40 in an at least partially fluid-tight manner, so as to prevent the filling of the tank(s). The automatic obstruction device 21 comprises at least one movable element 44, capable of being moved between a non-obstruction position of the filling circuit, shown in FIG. 4, in which the at least one movable element 44 is positioned so as to offer fluid resistance compatible with the filling of the tank, and an obstruction position of the filling circuit 40, shown in FIG. 5, in which the at least one movable element 21 is positioned at least partly in at least one portion 46 of the filling circuit 40, so as to offer resistance to the fluid incompatible with the filling of the tank, which is symbolized in FIG. 5 by the stopping of the arrow 42 before this portion 46 of the filling circuit 40.

The filling circuit 40 also comprises at least one orifice 48 located in at least one wall 50 of the at least one portion 46 of the filling circuit 40, capable of allowing the at least one movable element 44 to pass into the filling circuit 40, so that the at least one movable element 44 can reach the obstruction position. In this embodiment, the wall 50 in which the orifice 48 is located is a side wall of the portion 46 of the filling circuit 40.

The automatic obstruction device 21 further comprises:
at least one holding element 52 of the at least one movable element 44, suitable for
    holding the movable element 44 in the non-obstruction position,
    sealing said at least one orifice 48 in a fluid-tight manner, and
    being deformed or moved so as to allow the movement of the at least one movable element 44 toward the obstruction position,
at least one first means 54 of non-reversible movement or non-reversible modification of the at least one holding element 52 so as to allow the movement of the at least one movable element 44 toward the obstruction position,
the at least one first means 54 of non-reversible movement or non-reversible modification being controllable by a control device 51.

In the embodiment of FIGS. 4 and 5, the portion 46 of the filling circuit 40 in which the orifice 48 is located comprises, in the wall 50, an undercut 58 arranged opposite the orifice 48, diametrically opposite the orifice 48, in which undercut 58 the movable element 44 can come to be at least partly housed in the obstruction position. The undercut 58 constitutes a receiving seat for the free end 60 of the movable element 44.

In the embodiment of FIGS. 4 and 5, the automatic obstruction device 21 further comprises a guide 62, which is a hollow body comprising a distal bearing surface 63. The movable element 44 is moved in the guide 62 to pass from the non-obstruction position to the obstruction position. The automatic obstruction device 21 further comprises a second means 64 for moving the movable element 44 toward the obstruction position when the latter has been released from the holding element 52. The second movement means 64 shown in FIGS. 4 and 5 is an elastic element, more precisely a spring, which acts between the movable element 44 and the distal bearing surface 63.

In FIGS. 4 and 5, the movement of the movable element 44 is carried out in a direction substantially transverse to the longitudinal direction of the portion 46 of the filling circuit 40 in which the orifice 48 is located.

The automatic obstruction device 21 further comprises a locking element in the obstruction position, not shown.

The movable element 44 can be moved between the obstruction position and the non-obstruction position under the action of an unlocking tool, not shown.

Figure 6:
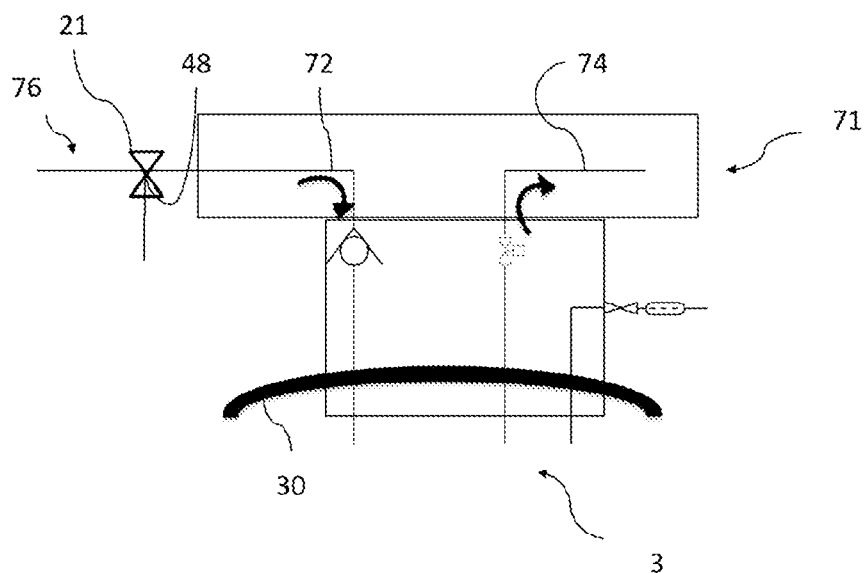
FIG. 6 is a schematic view of a valve of a filling circuit according to one embodiment of the invention in which the automatic obstruction device is positioned in a line dedicated to filling located upstream of the inlet pipe of the valve.
Figure 7:
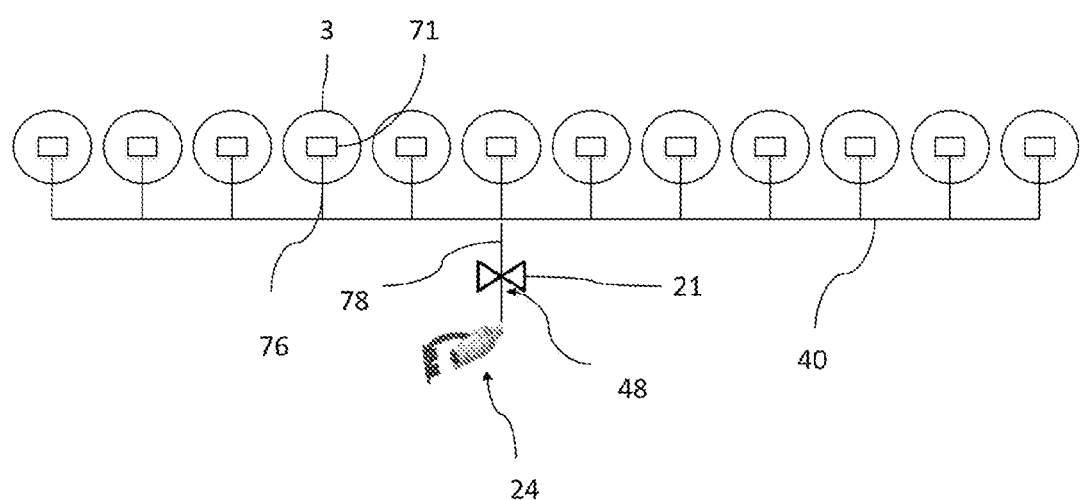
FIG. 7 is a schematic view of a filling circuit according to one embodiment of the invention in which the automatic obstruction device is positioned in a filling interface of the filling circuit connected to a filling station.

For simplicity, the movable element, the holding element and the first non-reversible movement means of the automatic obstruction device 21 are not shown in the embodiments of FIGS. 2, 6 and 7.

In the embodiment of FIG. 2, the orifice 48 of the filling circuit 40 is located in the inlet pipe 2 upstream of the valve 1. The control device 51 is the internal computer 7 of the valve 1.

In the embodiment of FIG. 6, the orifice 48 of the filling circuit 40 is located in a line 76, for example, dedicated to filling, located upstream of the inlet pipe 72 of a valve 71 of the state of the art. The control device 51 is a computer external to the valve, not shown. In another embodiment, similar in all respects to this embodiment, the valve could be the valve according to the invention, comprising an internal computer.

In the embodiment of FIG. 7, the orifice 48 of the filling circuit 40 is located in a filling interface 78 of the filling circuit 40, which is connected to the filling station, not shown, through the filler neck 24. In another embodiment, similar in all respects to this embodiment, the valve could be the valve according to the invention, comprising an internal computer. In this embodiment, all the tanks and the external computer constitute a system within the meaning of the invention.

Figure 8:
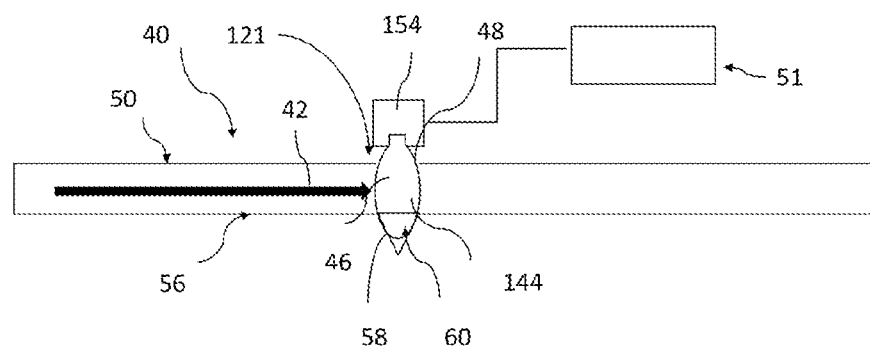
FIG. 8 is a schematic view of a circuit for filling tank(s) with a fluid according to another embodiment of the invention, in which the automatic obstruction device is in the obstruction position.

FIG. 8 shows an embodiment of the filling circuit according to the invention, differing from the embodiment of FIGS. 4 and 5 in that the automatic obstruction device 121 includes the movable element 144 which is an enclosure 144. As shown in FIG. 8, the enclosure 144 is inflated under the pressure of a non-compressible fluid, for example water. It is in communication with a water pump 154, placed under the control of the control device 51; the water pump could be replaced by another fluid injection device, for example, a piston. The water pump 154 constitutes a first non-reversible movement means within the meaning of the invention. In the non-obstruction position, not shown, the volume of the enclosure 144 is very small. The enclosure 144 is located outside the filling circuit 40. When the water pump 154 is activated, the enclosure 144 undergoes an expansion movement that allows it to move from the non-obstruction position to the obstruction position shown in FIG. 8. In this embodiment, the movable element 144 also constitutes the holding element, since in the uninflated state, it is retained in the non-obstruction position. Alternatively, the water could be replaced by an oil, for example engine oil.

Alternatively, the fluid could be compressible, such as air or another gas such as carbon dioxide or nitrogen. In this variant, the enclosure 144 could be the enclosure of a "mini airbag" inflated by the gas injected by a chemical reaction.

Figure 9:
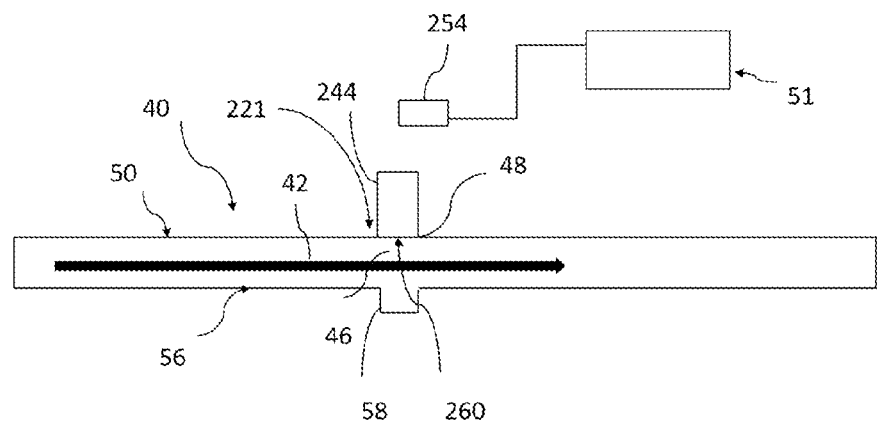
FIG. 9 is a schematic view of a circuit for filling tank(s) with a fluid according to another embodiment of the invention, in which the automatic obstruction device is in the non-obstruction position.

FIG. 9 shows an embodiment of the filling circuit according to the invention, differing from the embodiment of FIGS. 4 and 5 in that the movable element 244 of the automatic obstruction device 221 is a part whose section and material, here rubber, allow it to be retained in the orifice 48, outside the filling circuit 40, while sealing this orifice 48 in a fluid-tight manner. The activation of a pyrotechnic device 254 makes it possible to propel the movable element 244 from the non-obstruction position, shown in FIG. 9, toward the obstruction position, not shown, in which the free end 260 of the movable element 244 is in the undercut 58. The movable element and the holding element form one and the same element 244 capable of being retained in the non-obstruction position when the pyrotechnic device 254, which constitutes a first non-reversible movement means within the meaning of the invention, has not yet been activated.

The invention is not limited to the embodiments described here, and other embodiments will become clearly apparent to a person skilled in the art.

LIST OF REFERENCES

1: valve comprising an internal computer,
2: valve inlet pipe,
3: tank,
4: valve outlet pipe,
5: computer external to the valve,
6: inlet valve,
7: internal computer,
8: outlet valve,
9: first means for acquiring data from a sensor,
10: TPRD decompression device,
11: means of communication with the external computer,
12: power supply unit,
13: valve actuator control means,
14: electrical connection,
15: electrical connection between the valve and the actuator,
16: central processing unit,
17: means of measuring at least one current parameter in the electrical connection 15,
18: connection between the means of communication and the external computer,
19: second way to acquire, store and communicate data concerning the usage period of the tank,
20: third way to acquire data from another sensor,
21: means to prevent filling of the tank in the event of a safety risk (automatic obstruction device),
22: system comprising several tanks and an external computer,
23: single fluid manifold,
24: filler neck,
25: sensor for measuring tank integrity,
26: means for controlling an automatic obstruction device of the filling circuit of the tank,
27: safety pressure sensor,
28: microprocessor,
29: safety valve,
30: upper end of the tank,
31: infrared communication device,
32: electrical connection,
33: vehicle battery,
34: pressure sensor,
35: temperature sensor,
36: pressure regulator,
37: technical perimeter of the vehicle,
38: technical perimeter of the valve,
40: filling circuit,
42: arrow symbolizing the flow of fluid in the filling circuit,
44: movable element,
46: portion of the filling circuit in which the movable element is positioned in the obstruction position,
48: orifice,
50: wall of the portion of the filling circuit in which the orifice is located,
51: control device,
52: holding element,
54: first means of non-reversible movement or non-reversible modification of the holding element,
58: undercut,
60: free end of the movable element,
62: guide,
64: second means for moving the movable element,
71: state-of-the-art valve,
72: inlet pipe of the valve 71,
74: outlet pipe of the valve 71,
76: line dedicated to filling,
78: filling interface of the filling circuit,
100: actuator,
121: automatic obstruction device,
144: movable element,
154: air pump,
221: automatic obstruction device,
244: movable element,
254: pyrotechnic device,
260: free end of the movable element

The invention claimed is:

1. An automatic obstruction device for closing a filling circuit for filling one or more tank(s) with a fluid, in a manner at least partially sealed to the fluid, so as to prevent the filling of the one or more tank(s) when a predetermined event occurs, the automatic obstruction device comprising:
at least one movable element, capable of being moved between a non-obstruction position of the filling circuit, in which the at least one movable element is able to be positioned so as to offer a resistance to the fluid compatible with the filling of the tank, and an obstruction position of the filling circuit, in which the at least one movable element is able to be positioned so as to offer a resistance to the fluid that is incompatible with the filling of the tank,
at least one holding element of the at least one movable element, the at least one holding element being configured to
hold the at least one movable element in the non-obstruction position, and
move so as to allow the movement of the at least one movable element toward the obstruction position, and
at least a first means of non-reversible movement of the at least one holding element so as to allow the movement of the at least one movable element only toward the obstruction position, the at least first means of non-reversible movement being controllable by a control device,
wherein the at least one holding element moves in a direction substantially transverse to a direction in which the at least one movement element moves from the non-obstruction position of the filling circuit to the obstruction position of the filling circuit.

2. The device according to claim 1, wherein the at least one movable element is configured to be positioned at least in part in at least one portion of the automatic obstruction device, which portion is configured to be assembled in a sealed manner to the filling circuit, at least one orifice is located in at least one wall of the at least one portion of the automatic obstruction device, the at least one orifice is configured to:
be sealed in a fluid-tight manner by the at least one holding element of the at least one movable element, and
allow the at least one movable element to enter the at least one portion, so that the at least one movable element can reach the obstruction position.

3. The device according to claim 1, wherein the predetermined event is a detection of a safety defect of at least one of the tanks.

4. A filling circuit for filling one or more tank(s) with a fluid comprising a device according to claim 1.

5. The circuit according to claim 4, wherein the one or more tank(s) are connected in a leak-tight manner to the filling circuit.

6. An assembly of a filling circuit for filling one or more tank(s) with a fluid according to claim 4, the one or more tank(s) and a control device.

7. The assembly according to claim 6, wherein the control device is a computer.

8. The assembly according to claim 7, further comprising:
at least one valve for a fluid tank, the at least one valve comprising:
  at least one portion of a sensor, for measuring at least one parameter characterizing the fluid, the valve being capable of receiving information from a computer, external to the valve, and
an internal computer, the internal computer comprising:
  a first acquisition means configured to acquire data from the at least one portion of the sensor,
  a communication means capable of communicating bidirectionally with the external computer, and
  a control means configured to take into account information received from the external computer and data from the at least one portion of the sensor for controlling at least one actuator of the valve, in which assembly the computer is the internal computer.

9. A method for securing one or more fluid tank(s) forming part of an assembly according to claim 6, comprising:
taking into account by the control device of safety defect information of at least one of the tanks,
transmitting of an obstruction order by the control device to at least one automatic obstruction device,
taking into account of the order by the at least one automatic obstruction device, and
passing of at least one automatic obstruction device from the non-obstruction position to the obstruction position.

10. The device according to claim 1, further comprising:
a guide being a hollow body including a distal bearing surface, the at least one movable element being moved in the guide to pass from the non-obstruction position of the filling circuit to the obstruction position of the filling circuit; and
an elastic element disposed between the at least one movable element and the distal bearing surface, the elastic element moving the at least one movable element toward the obstruction position of the filling circuit when the at least one movable element is released from the at least one holding element.

* * * * *